Patented June 21, 1938

2,121,533

UNITED STATES PATENT OFFICE 2,121,533

METHOD OF CARRYING OUT CERTAIN OXIDATIVE FERMENTATION PROCESSES BY BACTERIA

Percy A. Wells, Arlington, Va., Lewis B. Lockwood and Joseph J. Stubbs, Washington, D. C., assignors to Henry A. Wallace, Secretary of Agriculture of the United States of America, and his successors in office No Drawing. Application April 12, 1937, Serial No. 136,270

3 Claims. (Cl. 195—49)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government for governmental purposes without the payment to us of any royalty thereon.

Our invention relates to the method of carrying out oxidative fermentation of aliphatic polyhydric alcohols by bacteria growing in a submerged condition, under pressures greater than atmospheric.

It has been known for many years that certain bacteria, for example, the Acetobacter group of bacteria, exert a strong oxidizing reaction on the substrate on which they are grown, and for this reason they have been employed industrially for the oxidation of aldoses to their corresponding aldonic acids, as for example, glucose to gluconic acid; polyhydroxy alcohols to ketones, as for example, d-sorbitol to 1-sorbose and glycerine to dihydroxyacetone. It is known that these bacteria, which are ordinarily cultivated in surface films, will grow normally and ferment actively in a submerged state in fermentation liquors if they are well agitated and aerated. Thus Kluyver and Scheffer have patented a process (U. S. 1,833,716) for the production of dihydroxyacetone from glycerol by bacteria of the Acetobacter group in which high yields of the product are obtained within 24 hours, provided the fermenting liquor is well aerated. Currie and Finlay have obtained a patent (U. S. 1,908,225) in which the novel features consist of high speed agitation, the mixing of large quantities of air with the culture liquid and the production of gluconic acid from glucose; of dihydroxyacetone from glycerol by submerged growths of bacteria of the Acetobacter group in the foamy liquid so produced.

Our invention differs from the foregoing teachings in that we have found that by treating a nutrient liquor, containing various organic or inorganic constituents, along with varying concentrations of the polyhydric alcohol to be oxidized, with a suspension of an active culture of bacteria of the genus Acetobacter, and maintaining the culture liquid under pressures of gases, containing substantial quantities of oxygen, such as air, above that of the atmosphere, and at the same time agitating the solution in any suitable manner, and passing the air through it, the yields of compounds produced by the oxidation of the polyhydric alcohols are greatly increased and the fermentation time decreased over those carried out at atmospheric pressure, but otherwise under identical conditions.

While our process would appear to correspond to the teaching of May, et al. (U. S. 2,006,086) it is applied to the oxidation of polyhydric alcohols by film forming bacteria such as those of the Acetobacter group, rather than the oxidation of carbohydrates by mold fungi.

The following examples illustrate our preferred method of carrying out our process, but we do not wish to restrict ourselves thereto, since it is obvious that other forms of apparatus could be used, so long as provision is made for maintaining a pressure greater than atmospheric.

Likewise, we do not wish to restrict ourselves to the use of bacteria of the Acetobacter group, since it is well known that other species of film forming bacteria possess similar oxidizing characteristics.

*Example 1.*—3200 cc. of solution containing 350 grams of d-sorbitol and 16 grams of Difco yeast extract were placed in a 6 liter Florence flask and sterilized. After sterilization the solution was inoculated with 200 cc. of a suspension of an active culture of a film forming bacteria of the Acetobacter group. The inoculated solution was then transferred to a rotary drum fermenter. A known constant flow of air at atmospheric pressure was passed through the fermenter, and the solution was agitated. A temperature of 30° was maintained throughout the entire fermentation period. The course of the fermentation was followed by analysis of samples taken at intervals during the fermentation. After a period of 28 hours, the contents of the fermenter were analyzed.

316 grams of 1-sorbose were produced, equivalent to a theoretical yield of 91.2%.

*Example 2.*—The same conditions were used as in Example 1, except that a gauge pressure of 30 pounds was maintained and the fermentation period was shortened to 17 hours.

333 grams of 1-sorbose were produced, equivalent to a theoretical yield of 96.2%.

*Example 3.*—The same conditions were used as in Example 1, except that 320 grams of glycerine were used instead of d-sorbitol. The duration of the fermentation period was 35 hours. 275 grams of dihydroxyacetone were produced, equivalent to a theoretical yield of 87.9%.

*Example 4.*—The same conditions were used as in Example 3, except that a gauge pressure of 30 pounds was maintained and the duration of the fermentation was shortened to 32 hours.

301 grams of dihydroxyacetone were produced, equivalent to a theoretical yield of 96.1%.

Having thus described our invention, what we claim for Letters Patent is:

1. A process for carrying out oxidative fermentations, comprising inoculating an aqueous aliphatic secondary polyhydric alcohol solution containing a nutrient with bacteria of the genus Acetobacter, maintaining aeration and agitation of the inoculated solution, the while maintaining the same under superatmospheric pressure of gases containing substantial quantities of oxygen.

2. A process for preparing a ketone from an aliphatic secondary polyhydric alcohol, comprising inoculating an aqueous aliphatic secondary polyhydric alcohol solution containing a nutrient with bacteria of the genus Acetobacter, maintaining aeration and agitation of the inoculated solution, the while maintaining the same under superatmospheric pressure of gases containing substantial quantities of oxygen.

3. A process for the manufacture of l-sorbose from d-sorbitol, comprising inoculating an aqueous d-sorbitol solution containing a nutrient with bacteria of the genus Acetobacter, maintaining aeration and agitation of the inoculated solution, the while maintaining the same under superatmospheric pressure of gases containing substantial quantities of oxygen.

PERCY A. WELLS.
LEWIS B. LOCKWOOD.
JOSEPH J. STUBBS.